US009363815B2

(12) United States Patent
Dong et al.

(10) Patent No.: US 9,363,815 B2
(45) Date of Patent: Jun. 7, 2016

(54) METHOD FOR SDMA TRANSMISSION IN MULTICARRIER MU MIMO SYSTEM AND BASE STATION

(71) Applicant: Huawei Technologies Co., Ltd., Shenzhen (CN)

(72) Inventors: Mingjie Dong, Shenzhen (CN); Yao Cheng, Shenzhen (CN); Sheng Li, Shenzhen (CN); Florian Roemer, Ilmenau (DE); Jianshu Zhang, Shenzhen (CN); Martin Haardt, Ilmenau (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 14/199,471

(22) Filed: Mar. 6, 2014

(65) Prior Publication Data

US 2014/0185564 A1 Jul. 3, 2014

Related U.S. Application Data

(63) Continuation of application No. PCT/CN2012/081079, filed on Sep. 6, 2012.

(30) Foreign Application Priority Data

Sep. 6, 2011 (CN) .......................... 2011 1 0262687

(51) Int. Cl.
*H04W 72/04* (2009.01)
*H04L 12/26* (2006.01)
(Continued)

(52) U.S. Cl.
CPC ........... *H04W 72/046* (2013.01); *H04B 7/0452* (2013.01); *H04L 43/08* (2013.01); *H04L 25/0204* (2013.01); *H04L 25/0242* (2013.01); *H04L 25/03898* (2013.01)

(58) Field of Classification Search
CPC .... H04B 7/0619; H04B 7/0452; H04L 43/08; H04L 25/0242
See application file for complete search history.

(56) References Cited

U.S. PATENT DOCUMENTS

| 7,894,858 B2 | 2/2011 | Ko et al. |
| 2004/0087343 A1 | 5/2004 | Lucidarme et al. |

(Continued)

FOREIGN PATENT DOCUMENTS

| CN | 1832387 A | 9/2006 |
| CN | 101312371 A | 11/2008 |

(Continued)

OTHER PUBLICATIONS

Rouquette-Léveil et al., "Final CG "local area" description for integration into overall System Concept and assessment of key technologies" Information Society Technologies, IST-4-027756 WINNER II, D6.13.12 v1.0, Oct. 31, 2007, 86 pages.

(Continued)

Primary Examiner — Omer S Mian
(74) Attorney, Agent, or Firm — Brinks Gilson & Lione

(57) ABSTRACT

The present invention provides a method for scheduling a SDMA user group in an MU MIMO system and a base station. The method comprise the following steps: calculating, according to channel state information, a projection matrix of a channel matrix of each user in a user group on a joint channel matrix of other users in the same user group, where the user group is selected from a plurality of users; calculating a capacity metric of the user group according to the projection matrixes; and selecting an optimal user group according to the metrics of a plurality of user groups. The present invention effectively eliminates the MUI on terminal users at the transmitter side, and reduces the computational complexity.

13 Claims, 6 Drawing Sheets

(51) Int. Cl.
*H04B 7/04* (2006.01)
*H04L 25/02* (2006.01)
*H04L 25/03* (2006.01)

(56) References Cited

U.S. PATENT DOCUMENTS

| | | | |
|---|---|---|---|
| 2004/0120274 A1* | 6/2004 | Petre | H04B 7/04 370/320 |
| 2008/0291851 A1 | 11/2008 | Guthy et al. | |
| 2010/0054113 A1* | 3/2010 | Haardt | H04B 7/0619 370/203 |
| 2011/0211628 A1* | 9/2011 | Hammarwall | H04B 7/0619 375/224 |
| 2012/0120884 A1* | 5/2012 | Yu | H04B 7/0426 370/329 |
| 2012/0213169 A1 | 8/2012 | Wang et al. | |

FOREIGN PATENT DOCUMENTS

| | | |
|---|---|---|
| CN | 101346902 A | 1/2009 |
| CN | 101917218 A | 12/2010 |
| CN | 101997655 A | 3/2011 |
| WO | WO 2010/022122 A1 | 2/2010 |

OTHER PUBLICATIONS

Lestable et al., "D2.2.3 Modulation and Coding schemes for the WINNER II System" Information Society Technologies, IST-4-027756 WINNER II, D2.2.3 v1.0, Nov. 29, 2007, 117 pages.

Spencer et al., "Zero-Forcing Methods for Downlink Spatial Multiplexing in Multiuser MIMO Channels" IEEE Transactions on Signal Processing, vol. 52, No. 2, Feb. 2004, 11 pages.

Song et al., "Flexible Coordinated Beamforming (FlexCoBF) Algorithm for the Downlink of Multi-User MIMO Systems" 2010 International ITG Workshop on Smart Antennas (WSA 2010), IEEE 2010, 7 pages.

Song et al., "Utility-Based Resource Allocation and Scheduling in OFDM-Based Wireless Broadband Networks" Cross-Layer Design, IEEE Communications Magazine, Dec. 2005, 8 pages.

Song et al., "Multi-User MIMO Downlink Precoding for Time-Variant Correlated Channels" 2009 International ITG Workshop on Smart Antennas—WSA 2009, Berlin, Germany, Feb. 16-18, 2009, 6 pages.

Stankovic et al., "Generalized Design of Multi-User MIMO Precoding Matrices" IEEE Transactions on Wireless Communications, vol. 7 No. 3, Mar. 2008, 9 pages.

Stankovic, Veljko, and Martin Haardt. "Multi-user MIMO downlink precoding for users with multiple antennas." Proc. of the 12-th Meeting of the Wireless World Research Forum (WWRF), Toronto, ON, Canada. vol. 10. 2004, 6 pages.

Schumacher et al., "Description of a MATLAB® implementation of the Indoor MIMO WLAN channel model proposed by the IEEE 802.11 TGn Channel Model Special Committee" Implementation note version 3.1, Jan. 2004, 27 pages.

Pun et al., "Performance Analysis of Joint Opportunistic Scheduling and Receiver Design for MIMO-SDMA Downlink Systems" IEEE Transactions on Communications, vol. 59, No. 1, Jan. 2011, 13 pages.

Xingmin et al., "Utility Based Scheduling for Downlink OFDMA/SDMA Systems with Multimedia Traffic" IEEE Communications Society 2010, 6 pages.

Jiang et al., "Joint Transceiver Design for MIMO Communications Using Geometric Mean Decomposition" IEEE Transactions on Signal Processing, vol. 53, No. 10, Oct. 2005, 13 pages.

Lin et al., "Block Diagonal Geometric Mean Decomposition (BD-GMD) for MIMO Broadcast Channels" IEEE Transactions on Wireless Communications, vol. 7, No. 7, Jul. 2008, 12 pages.

Jensen et al., "Fast Link Adaptation for MIMO OFDM" IEEE Transactions on Vehicular Technology, vol. 59, No. 8, Oct. 2010, 13 pages.

Ikuno et al., "System level simulation of LTE networks" IEEE 2010, 5 pages.

Stacey et al., "'Proposed TGac Draft Amendment" IEEE P802.11 Wireless LANs, Jan. 2011, 154 pages.

Loc et al., "TGac Functional Requirements and Evaluation Methodology Rev. 0" IEEE P802.11 Wireless LANs, Apr. 2009, 18 pages.

Breit et al., "TGac Channel Model Addendum" IEEE P802.11 Wireless LANs, May 2009, 7 pages.

IEEE Computer Society "IEEE Standard for Information Technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput" 802.11n™ 2009, 536 pages.

Ericsson, "System-level evaluation of OFDM—further considerations" Agenda Item 10.1, TSG-RAN WG1 #35, Lisbon, Portugal, Nov. 17-21, 2003, 6 pages.

Chae et al., "Coordinated Beamforming for the Multiuser MIMO Broadcast Channel with Limited Feedforward" IEEE Transactions on Signal Processing, vol. 56, No. 12, Dec. 2008, 13 pages.

Ginis et al., "A Multi-user Precoding Scheme achieving Crosstalk Cancellation with Application to DSL Systems" IEEE 2000, 5 pages.

Fuchs et al., "Low-Complexity Space-Time-Frequency Scheduling for MIMO Systems with SDMA" IEEE Transactions on Vehicular Technology, vol. 56, No. 5, Sep. 2007, 10 pages.

* cited by examiner

METHOD FOR SDMA TRANSMISSION IN MULTICARRIER MU MIMO SYSTEM AND BASE STATION

CROSS-REFERENCE TO RELATED APPLICATIONS

This application is a continuation of International Application No. PCT/CN2012/081079, filed on Sep. 6, 2012, which claims priority to Chinese Patent Application No. 201110262687.2, filed on Sep. 6, 2011, both of which are hereby incorporated by reference in their entireties.

TECHNICAL FIELD

The present invention relates to communication networks and, in particular, to a multiple-input multiple-output based space division multiple access technology.

BACKGROUND

MIMO technology (Multiple-Input Multiple-Output, multiple-input multiple-output) allows multiple antennas simultaneously transmit and receive multiple spatial streams. By using the MIMO technology, the channel capacity can be increased, in the meantime, the reliability of a channel can be improved, and the error rate can be reduced. The SDMA (Space Division Multiple Access, space division multiple access) is a newly developed multiple access technology, which use spatial segmentation to constitute different channels. Because the SDMA technology has the potential to greatly improve the capacity and performance of wireless communication systems, it has caused widespread concern from researchers.

However, when the SDMA technology is applied to the MU MIMO scenario, the coordination between users becomes a key issue. Taking a cellular network as an example, in a downlink transmission, base stations simultaneously transmit signals to users. Therefore, part of signals received by each user is inter-user interference caused by signals of other users. Although, in theory, the user can utilize multi-user detection technology to eliminate multi-user interference (Multi-User Interference, MUI), given the demand of low power consumption, low complexity and low cost of the user, the MUI is expected to be eliminated at the base station side. Under the premise that channel state information (Channel State Information, CSI) is obtained by the base station side, the inter-user interference can be eliminated by adopting the linear or non-linear pre-coding technology. However, in a MU (Multi-User, multi-user) MIMO system, in order to obtain SDMA gain, spacial multiplexing user number on a given frequency and within a given time slot is limited. In addition, if the users which are served at the same time have great spatial correlation, the transmission performance would be reduced greatly. Therefore, it is need to utilize spatial scheduling algorithms to process the user selection in SDMA, so as to maximize the transmission performance of the system.

In the present ProSched spatial scheduling algorithms, the pre-coding process is interpreted as a mapping, thereby avoiding calculating pre-coding matrixes of all of the possible combinations of users. However, the original intention of the ProSched algorithms is to be applied to a single carrier system. Although an extended method which can be applied to the multi-carrier system can also be realized, this extended method is not applicable to IEEE 802.11ac system.

There is another existing method for performing the SDMA wireless communication with at least two users simultaneously. According to that patent application, all users are pre-sequenced in accordance with a certain rule, then all possible combinations of users are generated from these pre-sequenced users, where each combination includes at least two users. In this mechanism, it is assumed that each user has only one antenna. After the base station selects all combinations of users from K user sets, where each combination of users includes U users, the base station calculates the capacity of the $j^{th}$ combination of users as follows. First, the base station obtains a weight vector of the $j^{th}$ combination of users:

$$W_{ZF} = H^H(HH^H)^{-1} = [w^1 w^2 \ldots w^U]$$

where, $W_{ZF}$ represents a zero-forcing weight matrix, H represents a joint channel matrix of the $j^{th}$ combination of users. Then, the base station obtains SNR of the $u^{th}$ user in the $j^{th}$ combination of users group with the following formula:

$$SNR_u = \frac{|x^u|^2 / |w^u|^2}{\sigma_u^2}$$

where, $x^u$ represents a symbol transmitted by the $u^{th}$ user, $w^u$ is a zero-forcing weigh vector of the $u^{th}$ user, $\sigma_u^2$ is noise variance. Therefore, based on the SNR of the user, total capacity of the $j^{th}$ combination of users $C_j^{total}$ may be calculated according to the following formula:

$$C_j^{total} = \sum_{u=1}^{U} \log_2(1 + SNR_u)$$

The method uses the calculated capacity to perform scheduling.

However, the mechanism in the prior art is provide for the case that there is only one antenna at the UT side. Furthermore, the pre-coding algorithm is limited to the zero-forcing method, and how to use the scheduling mechanism and the present pre-coding algorithms jointly is not provided. When calculating the capacity according to the method, in which the zero-forcing (ZF) capacity or SNR of each combination of users is calculated and then a combination of users with the maximum ZF capacity or SNR is selected, calculating the weight matrix by adopting the zero-forcing method is introduced, however, the architecture of the MU MIMO transmission is not considered. In addition, it should be noted that the index in this method is designed only for the single carrier system or for one sub-carrier of the multi-carrier system, and could not be extended directly to be applied to the multi-carrier system.

SUMMARY

Embodiments of the present invention provide a new method for an SDMA transmission method to process selection of SDMA users in spatial scheduling, so as to maximize the transmission performance of the system.

At the first aspect, embodiments of the present invention provide a method for scheduling a SDMA user group in an MU MIMO system. The method includes the following steps:

calculating a projection matrix of a channel information matrix of a user on a joint channel matrix, where the joint channel matrix is a joint channel information matrix of other users in a user group of which the user is a member;

calculating a capacity metric of the user group according to the projection matrixes;

determining, according to capacity metrics of a plurality of user groups, a user group for which a SDMA transmission needs to be provided.

At the second aspect, embodiments of the present invention provide a base station which is configured to perform scheduling of user group in an SDMA system. The base station includes:

a projection matrix calculating module, configured to calculate a projection matrix of a channel information matrix of a user on a joint channel matrix, where the joint channel matrix is a joint channel information matrix of other users in a user group of which the user is a member;

a capacity metric calculating module, configured to calculate a capacity metric of the user group according to the projection matrix;

a user group selecting module, configured to determine, according to capacity metrics of a plurality of user groups, a user group for which a SDMA transmission needs to be provided.

In embodiments of the present invention, the spatial correlation of the users is reflected by the projection matrixes of users on different sub-carriers, the user group is selected by calculating the projection matrixes, thereby the MUI of the terminal user is effectively eliminated at the base station side. Embodiments of the present invention can also reduce the energy loss, which is caused by the spatial correlation between the users, in the uplink direction.

BRIEF DESCRIPTION OF DRAWINGS

Referring to the drawings, the following describes embodiments of the present invention more concretely, where.

DESCRIPTION OF EMBODIMENTS

Figure 1:
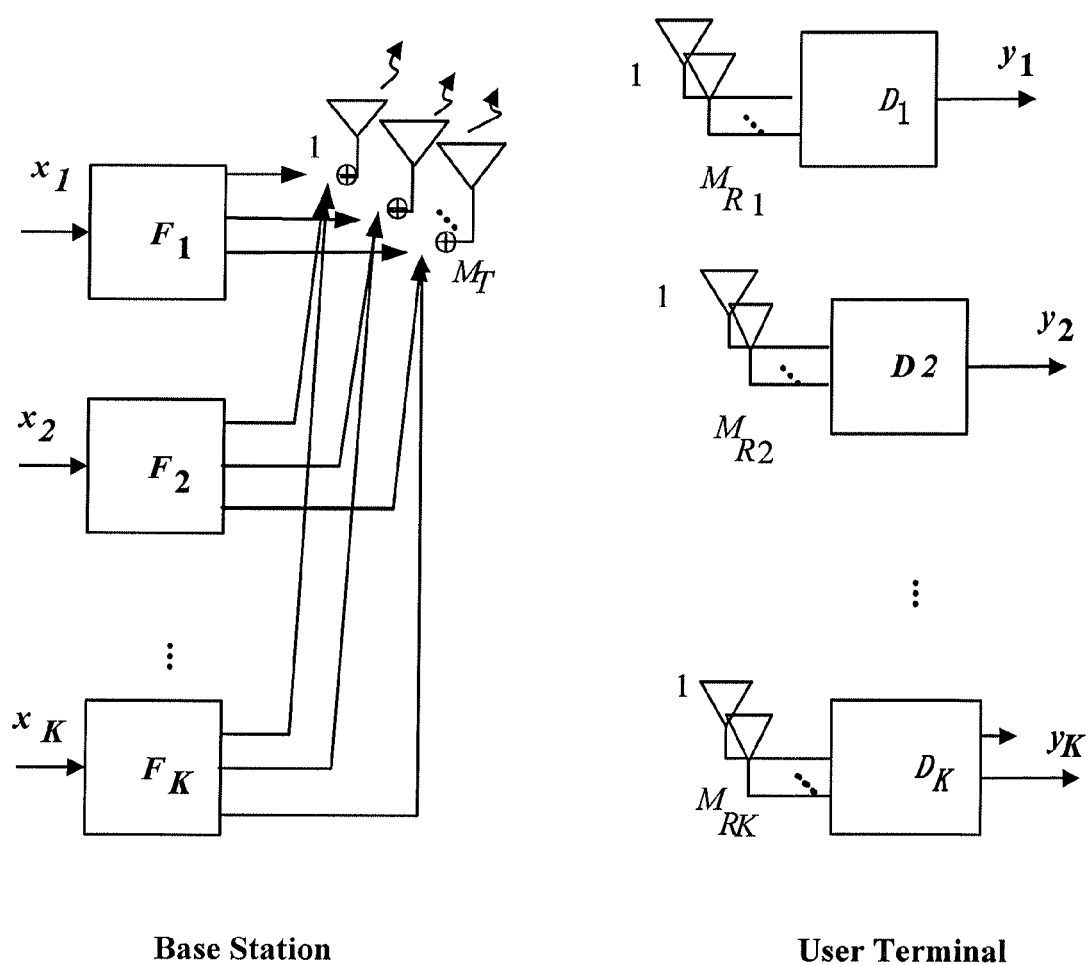
FIG. 1 is a block diagram of a MU MIMO downlink system.

FIG. 1 is a block diagram of a MU MIMO downlink system. As shown in FIG. 1, there are $M_T$ transmitting antenna equipped at the base station side; correspondingly, there are K user terminals, and each user terminal has $M_{R_i}$ receiving antennas, herein i=1, 2, . . . , K. Therefore, the total number of receiving antennas is $$M_R = \sum_{i=1}^{K} M_{R_i}.$$

The base station has the information of channels between the $M_T$ transmitting antenna and the receiving antennas of a single user terminal. It should be noted that, in this description, a user and a user terminal have the same meaning.

At the base station side, a transmitting signal to be transmitted to the $i^{th}$ user is defined as a $r_i$-dimensional vector, $x_i$, herein i=1, 2, . . . , K, $r_i$ is number of data stream transmitted to the $i^{th}$ user. A vector of K users may be expressed as $x=[x_1^T x_2^T \ldots x_K^T]^T \in \mathbb{C}^{r \times 1}$, herein $$r = \sum_{i=1}^{K} r_i.$$

Each transmitting signal needs to be pre-coded before being transmitted. A pre-coding matrix for K users may be expressed, by adopting the form of a joint pre-coding matrix, as: $F=[F_1 \ F_2 \ \ldots \ F_K] \in \mathbb{C}^{M_T \times r}$, herein $F_i \in \mathbb{C}^{M_T \times r_i}$ represents the pre-coding matrix of the $i^{th}$ user.

The transmitting signal for the $i^{th}$ user may be transmitted through $M_T$ transmitting antennas by adopting the SDMA mode, and then be received by one of or a plurality of the $M_{R_i}$ receiving antennas of the $i^{th}$ user. Under the assumption of OFDM (Orthogonal Frequency-Division Multiplexing, orthogonal frequency-division multiplexing) transmission, at a given frequency and a given time, the channel matrix of the $i^{th}$ user is expressed as $$H_i \in \mathbb{C}^{M_{R_i} \times M_T}.$$

The joint channel matrix of K users is expressed as follows: $H=[H_1^T H_2^T \ldots H_K^T] \in \mathbb{C}^{M_R \times M_T}$.

At the user terminal side, the received signal is decoded. A decoding matrix for the user terminal of the $i^{th}$ user is $$D_i \in \mathbb{C}^{r_i \times M_{R_i}}.$$

The decoding matrix for K users may be expressed, by adopting the form of a joint block-diagonal decoding matrix (joint block-diagonal decoding matrix), as:

$$D = \begin{bmatrix} D_1 & 0 & \ldots & 0 \\ 0 & D_2 & \ldots & \vdots \\ \vdots & \vdots & \ddots & \vdots \\ 0 & 0 & \ldots & D_k \end{bmatrix} \in \mathbb{C}^{r \times M_R}$$

Therefore, the receiving vector of K users may be expressed, by adopting the form of joint receiving vector, as:

$$y = D \cdot (H \cdot F \cdot x + n) \quad (1)$$

Herein, $y=[y_1^T y_2^T \ldots y_K^T] \in \mathbb{C}^{r \times 1}$, $y_i \in \mathbb{C}^{r_i \times 1}$ represents the receiving vector of the $i^{th}$ user, $n=[n_1^T n_2^T \ldots n_K^T] \in \mathbb{C}^{M_R \times 1}$ is zero-mean additive white Gaussian noise on the receiving antennas.

In the MU MIMO downlink data transmission, MUI (multi-user interference) on the user terminals is eliminated by using the pre-coding algorithm, and the computational complexity is reduced. A solution to the above problems is to determine, by using the spatial scheduling, which users and how many users can be determined to form an SDMA communication group for being served at the same time and at the same frequency.

According to embodiments of the present invention, the pre-coding process procedure is interpreted as a new orthogonal projection, and the pre-coding process is approximated by the orthogonal projection. In this application, this method is called EMC-ProSched (Efficient Multi-carrier, efficient multi-carrier) user grouping and scheduling method. This method is described in detail in the following.

Firstly, the channel matrix of the $i^{th}$ sub-carrier of the $i^{th}$ user is defined as $H_{i,j}$. In the user group S which includes N users, the rate of the $j^{th}$ sub-carrier of the $i^{th}$ user is estimated based on a method for calculating the minimum capacity limit of each sub-carrier of the $i^{th}$ user:

$$C_{i,j} = \log_2(1 + \sigma_n^{-2} \|H_{i,j} F_{i,j}\|_F^2), \quad (2)$$

Herein, $\sigma_n^2$ represents the noise power on each sub-carrier bandwidth of the receiver, $F_{i,j} \in \mathbb{C}^{M_t \times r_1}$ is the pre-coding matrix of the $j^{th}$ sub-carrier of the $i^{th}$ user.

Then, the diagonal matrix which includes the square root of each spatial stream allocated to the $i^{th}$ user is extracted. The remaining part of the pre-coding matrix is denoted by $M_{i,j} \in \mathbb{C}^{M_t \times r_1}$. Therefore, the pre-coding matrix of the $j^{th}$ sub-carrier of the $i^{th}$ user can be expressed as:

$$F_{i,j} = M_{i,j} G_{i,j}.$$

The objective of the spatial scheduling algorithm with low complexity is to avoid calculating the pre-coding matrixes of all user groups. Before pre-coding, the eigenvalues distribution of an equivalent channel $H_{i,j} F_{i,j}$ is not known. Therefore, it is difficult to obtain the optimal power allocation scheme when selecting users. Assuming that the total transmitting power is divided equally by users and, meanwhile, the power adopted by each spatial streams is equal, then the corresponding power diagonal matrix $G_{i,j}$ may be expressed as:

$$G_{i,j} = \sqrt{P_T/(N \cdot r_i)} I \quad (3)$$

Herein $P_T$ is the transmission power allocated to each sub-carrier. N is number of users in the user group, ri is number of spatial streams of the $i^{th}$ users. Compared to using optimal power allocation strategy, when using this equal power allocation strategy, the system performance is reduced.

Substitute equation (3) into equation (2), and the estimated transmission rate of the $j^{th}$ sub-carrier of the $i^{th}$ user in the user group S is obtained:

$$\eta_{i,j}^{(S)} = \log_2\left(1 + \frac{P_T}{Nr_i\sigma_n^2} \|H_{i,j} M_{i,j}\|_F^2\right) \leq C_{i,j} \quad (4)$$

The Log 2 function is a monotonically increasing function. Since only estimating levels of spatial correlation of different user groups according to the metrics is needed in embodiments of the present invention, therefore, equation (4) can be simplified to the following metric:

$$\bar{\eta}_{i,j}^{(S)} = \frac{1}{Nr_i} \|H_{i,j} M_{i,j}\|_F^2. \quad (5)$$

$H_{i,j} M_{i,j}$ is called an equivalent channel matrix.

Therefore, the scheduling metric of the $i^{th}$ user in the user group S may be defined as the weighted sum of the estimated rate (capacity) of the user on all sub-carriers:

$$\bar{\eta}_i^{(S)} = \sum_{j=1}^{N_{SD}} \bar{\eta}_{i,j}^{(S)} = \sum_{j=1}^{N_{SD}} \frac{1}{Nr_i} \|H_{i,j} M_{i,j}\|_F^2 \cdot \delta_j \quad (6)$$

Herein, $N_{SD}$ is number of data sub-carriers, $\delta_j$ is a weight factor, $j=1, 2, \ldots, N_{SD}$. In an example, all $\delta_j$ are 1, which means that weighting is not performed. In another embodiment, the weight factor $\delta_j$ may be configured as a step function (step function):

$$\delta_j = \begin{cases} 1, & \|H_{i,j} M_{i,j}\|_F^2 \geq \varepsilon \\ 0, & \text{other} \end{cases}$$

Herein $\varepsilon$ is a threshold. Under the effect of the weight factors, a sub-carrier, of which the frobenius of channel is small, will no longer be considered in the calculation of the metric of the user. This can guarantee that the user, of which only some sub-carriers have good channel quality while other sub-carriers suffer deep fading, will not be selected.

In the case that BD is used as the pre-coding algorithm, the frobenius of the equivalent channel matrix is equal to the frobenius of the projection channel, that is:

$$\|H_{i,j} M_{i,j}\|_F^2 = \|H_{i,j} \tilde{P}_{i,j}\|_F^2$$

Herein, the projection channel of the $j^{th}$ sub-carrier of the $i^{th}$ user is $\dot{H}_{i,j} = H_{i,j} \tilde{P}_{i,j}$, in which $\tilde{P}_{i,j}$ is the projection matrix of the matrix H. For other linear pre-coding algorithms, i the two sides of the above equation (7) are approximately equal. Therefore, the impact of the spatial correlation between users is taken into account by the frobenius (Frobenius) of the projection channel $\|H_{i,j} \tilde{P}_{i,j}\|$ also.

Therefore, the matrix $M_{i,j}$ in equations (5) and (6) may be replaced by $\tilde{P}_{i,j}$. The scheduling metric of the $i^{th}$ user in the user group S can be expressed as:

$$\bar{\eta}_i^{(S)} = \sum_{j=1}^{N_{SD}} \bar{\eta}_{i,j}^{(S)} = \sum_{j=1}^{N_{SD}} \frac{1}{Nr_i} \|H_{i,j} \tilde{P}_{i,j}\|_F^2 \cdot \delta_j \quad (8)$$

It can be seen from the above equation, the scheduling metric of the user can be calculated according to the projection matrix of the channel matrix $H_i$, and thus the selection of users is allowed, and the purpose of eliminating multi-user interference can be achieved.

Figure 2:
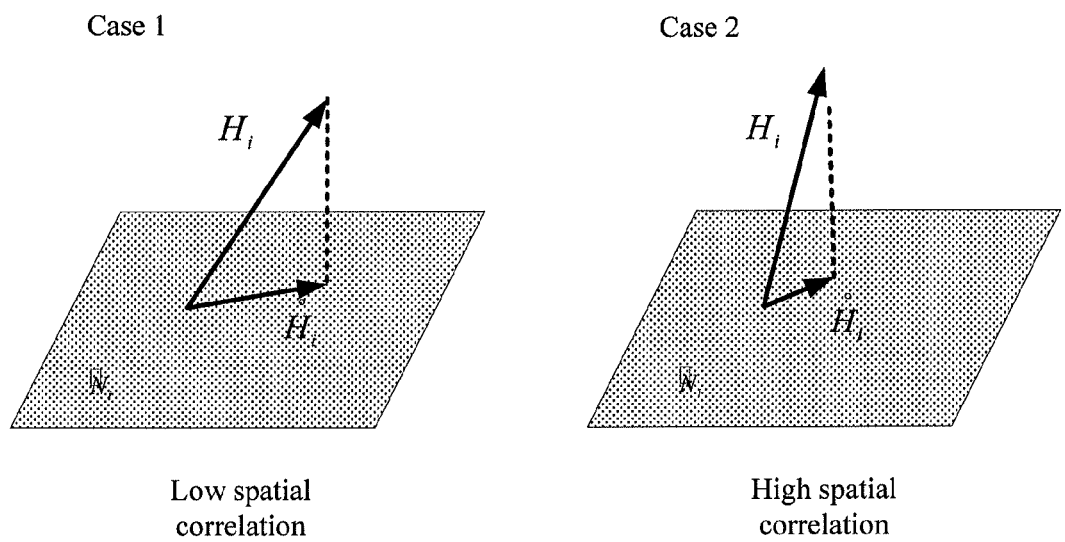
FIG. 2 illustrates a projection of a channel matrix of a user on a null matrix of the other users in the same group.

FIG. 2 illustrates a projection of a channel matrix of a user on a null matrix of the other users in the same group. The left part and the right part illustrate the high and the low correlation between users, respectively. In case 1, after the projection (that is, the eliminating of multi-user interference is performed), only a small part of the frobenius of the equivalent channel of the $i^{th}$ user is reduced. However, in case 2, due to the high spatial correlation between users, the signal space of the $i^{th}$ user is almost orthogonal with the common left null space (common left null space) of other users. So, in case 2, after the projection, the frobenius of the equivalent channel of the $i^{th}$ user is much reduced, thereby resulting in a great loss of energy.

Accordingly, in embodiments of the present invention, based on the relationship between the projection matrix of the users on different sub-carriers and the spatial correlation between the users, the projection matrix of each user on different sub-carriers is calculated, the frobenius of the product of the channel matrix and projection matrix of the user is solved and used as the scheduling metric to perform the selection of a user group, and then the SDMA transmission is performed for the selected user group. For a user group with high spatial correlation, the frobenius (Frobenius) of the projection channel matrix of each user in the user group is very small; the pre-coding efficiency of the user group will be greatly reduced, thereby the data rate will be also significantly reduced. According to the present invention, the sum of the metrics of this user group will be very small, which means that the possibility that this user group is selected is relatively low.

Although, in the foregoing, the BD algorithm is taken as an example to described the specific embodiments of the present invention, the scheduling criterion proposed by the EMC-ProSched may also be combined with other linear pre-coding algorithm (such as LP-GMD, LoCCoBF) besides the BD algorithm, to select the most suitable user group.

In an embodiment, according to IEEE 802.11 ac specification, an SDMA group is valid for at least one transmission packet. It can be seen from the simulation of the channel model D in 802.11ac, in the view of time dimension, the channel conditions do not change significantly when one packet is transmitted. Therefore, when performing the spatial scheduling algorithm, only the sub-carriers of one OFDM symbol needs to be considered.

In an embodiment, in order to avoid solving the pre-coding matrixes of all possible user groups in advance, a projection matrix of the $j^{th}$ sub-carrier of the $i^{th}$ user in the user group may be calculated by using the mode of the orthonormal basis of the signal space on the $j^{th}$ sub-carrier of the $i^{th}$ user. The approximate projection matrix $\tilde{P}_{i,j}$ is acquired by using the following equation:

$$\tilde{P}_{i,j}=(P_{1,j},\ldots,P_{i-1,j},P_{i+1,j},\ldots,P_{N,j})^p, p\to\infty$$

Herein, p is a projected order. $\tilde{P}_{i,j}$ may also be referred to as the joint projection matrix of the $j^{th}$ sub-carrier of other users except the projection matrix of the $j^{th}$ sub-carrier of the $i^{th}$ user. The projection order P may be selected as 1~3, which is sufficient. $\tilde{P}_{i,j}$ may be calculated by using the orthonormal basis of the signal space on the $j^{th}$ sub-carrier of the $i^{th}$ user, $$P_{i,j}=I-B_{i,j}B_{i,j}^H. \qquad (9)$$

In another embodiment, a singular value decomposition (singular value decomposition (SVD)) method is adopted to obtain the projection matrix $\tilde{P}_{i,j}$. That is, the singular value decomposition is performed to the joint channel matrix of the other users on the $j^{th}$ sub-carrier except the $i^{th}$ user, thereby the projection matrix of the $j^{th}$ sub-carrier of the $i^{th}$ user in the user group is calculated.

Specifically, the channel matrix $\tilde{H}_{i,j}$, of which the rank is $\tilde{L}_{i,j}$, is the joint channel matrix of the other users on the $j^{th}$ sub-carrier except the $i^{th}$ user, which is defined as follows:

$$\tilde{H}_{i,j}=[\tilde{H}_{1,j}^T \ldots \tilde{H}_{i-1,j}^T \tilde{H}_{i+1,j}^T \ldots \tilde{H}_{K,j}^T]^T.$$

By performing SVD to the channel matrix $\tilde{H}_{i,j}$, the following equation can be obtained:

$$\tilde{H}_{i,j}=\tilde{U}_{i,j}\tilde{\Sigma}_{i,j}[\tilde{V}_{i,j}^{(1)}\tilde{V}_{i,j}^{(0)}]^H \qquad (10)$$

Herein $\tilde{V}_{i,j}^{(1)}$ contains the first $\tilde{L}_{i,j}$ right singular vectors (right singular vectors); $\tilde{V}_{i,j}^{(0)}$ contains following $(M_T-\tilde{L}_{i,j})$ right singular vectors, these right singular vectors constitute the orthonormal basis of null space (null space) of $\tilde{H}_{i,j}$, $\dot{H}_{i,j}$ represents the equivalent channel matrix of the $j^{th}$ sub-carrier of the $i^{th}$ user after the MUI is eliminated, which is obtained by multiplying a channel matrix of the $j^{th}$ sub-carrier of the $i^{th}$ user with a projection matrix $\tilde{P}_{i,j}$, that is $$\dot{H}_{i,j}=H_{i,j}\tilde{P}_{i,j}$$

Herein, $\tilde{P}_{i,j}$ may be expressed as $$\tilde{P}_{i,j}=\tilde{V}_{i,j}^{(0)}\tilde{V}_{i,j}^{(0)H} \qquad (11)$$

Figure 3:
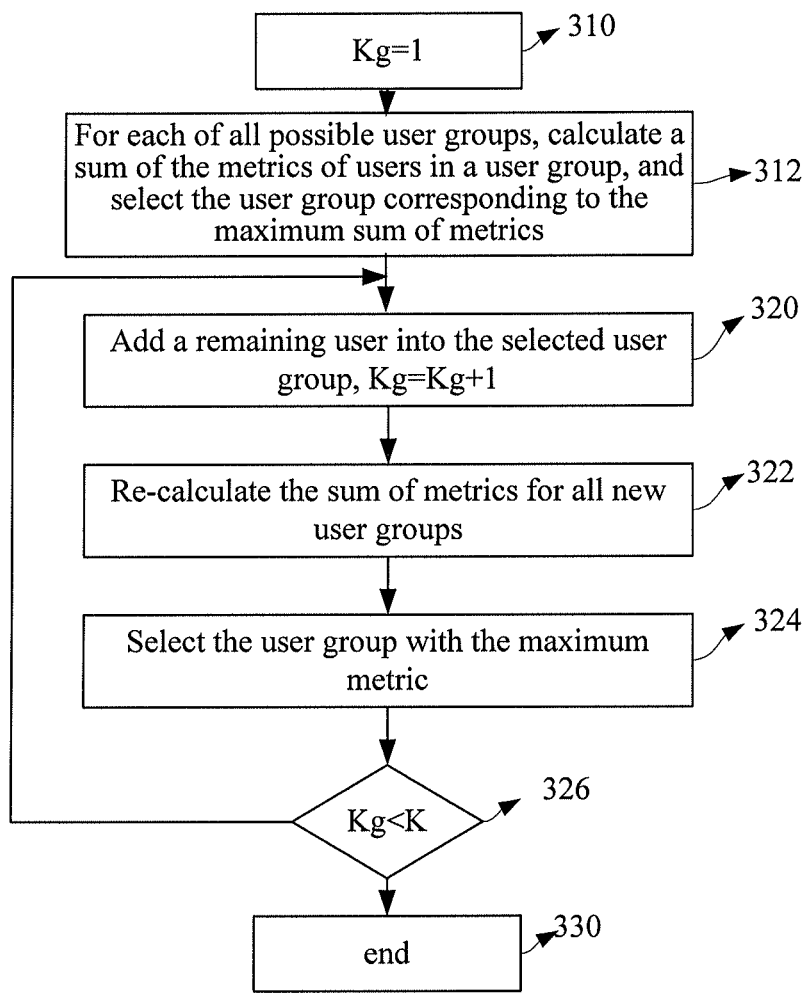
FIG. 3 is a schematic flowchart of an EMC-ProSched mechanism while taking a MU MIMO system with K users as an example.

FIG. 3 is a schematic flowchart of an EMC-ProSched mechanism while taking a MU MIMO system with K users as an example. As shown in FIG. 3, in step 310, set the number of users in an SDMA user group to $K_g=1$. In other words, each user is a user group.

In step 312, for each of all possible user groups, calculate a sum of the metrics of users in a user group, and select the user group $S_1^{opt}$, corresponding to the maximum sum of metrics.

In step 320, add a user, which is selected from the remaining users, into the user group $S_{K_g-1}^{opt}$ which is selected in the above step, and thereby $K_g=K_g+1$.

In step 322, re-calculate the metric of each user in the new user group, and calculate the sum of the metrics for the new user group accordingly.

In step 324, select a best user group $S_{K_g}^{opt}$ according to the sums of the metrics corresponding to the user groups calculated previously. In an example, the user group corresponding to the maximum sum of the metrics is the best user group.

In step 330, compare number of users in the user group with the total number of users in the system K. If $K_g<K$, return to step 320. If $K_g=K$, compare the sums of the metrics of user groups with different user number (such as $S_1^{opt}, S_2^{opt}, \ldots, S_K^{opt}$). According to the metrics of the plurality of user groups, select the user group. In an embodiment, select a user group corresponding to the maximum sum of metrics, then number of users in the selected SDMA user group, is the optimal size of an SDMA user group.

In the preceding step 312, a variety of methods may be used to determine possible user groups. In an embodiment, a tree-based sorting algorithm may be used to add a user or delete a user from a user group, so as to determine the possible user groups. The tree-based sorting algorithm is described in detail as following. Assuming there are, for example, 5 users, i.e., users 1-5, in the MU MIMO system. First, under the premise that a group contains only one user, calculate the sum of metrics for each group, where the algorithm for the calculation may be the SVD algorithm; as a result, the user group, of which user 1 is a member, is determined to be the optimal user group. Next, add user 2, of which the metric is greater, to the user group of which user 1 is a member, then re-calculate the sum of metrics for each group (of course, the user groups of which users 3-5 are a member respectively have not changed, so they are not necessary to be re-calculated), and then determine an optimal user group (user 1, user 2) is determined, where the algorithm for the calculation may be the SVD algorithm or the algorithm which combines equation (9) and equation (8). Next, according to values of the metrics, add user 4, user 3 and user 5 into the user group successively. Finally, compare the sums of metrics for the user groups in each round, and determine the optimal user group.

The scheduling according to the above steps, at the initial stage, only needs to perform SVD decomposition $KN_{SD}$ times, and the main complexity of performing pre-coding by using SVD decomposition method concentrates on the calculation amount of the SVD decomposition. The complexity of performing SVD to a M*N matrix is min(MN², M²N). Therefore, the EMC-ProSched algorithm may be called low complexity algorithm, because the EMC-ProSched algorithm reduces, comparing with the conventional user selection algorithms, times of performing the SVD decomposition, especially for the multi-carrier systems. For example, for a system having 16 users, number of data sub-carriers $N_{SD}$ is 234, the size of the user group is set to be 4, the times of SVD decomposition needed by the EMC-ProSched algorithm is 234×16=3744. However, for traditional scheduling algorithms, the same scheduling task need 234×((16−1)×2+(16−2)×3+(16−3)×4)=29016 times SVD decomposition.

Therefore, compared with the ProSched scheduling method, the EMC-ProSched has lower computational complexity, and needs less signaling overhead. In addition, the scheduling method provided by the present patent application may be combined more flexibly with the pre-coding algorithms, and there is no limit to number of antennas of the user terminal.

The present invention is applicable not only to the MU MIMO downlink system in which SDMA is combined with OFDM, but also to the MU MIMO downlink system in which SDMA is combined with OFDMA. It should be noted that, the multiple access of OFDMA is achieved by allocating different sub-carriers to different users. For example, all users transmit simultaneously, and each user adopts different sub-carrier sets. When SDMA and OFDMA are jointly used, each sub-carrier set is used by a group of users, rather than by one. Therefore, when a user group in which the users are served simultaneously on the same sub-carrier set, the scheduling algorithm EMC-ProSched may be further performed to the selected user group.

Figure 4:
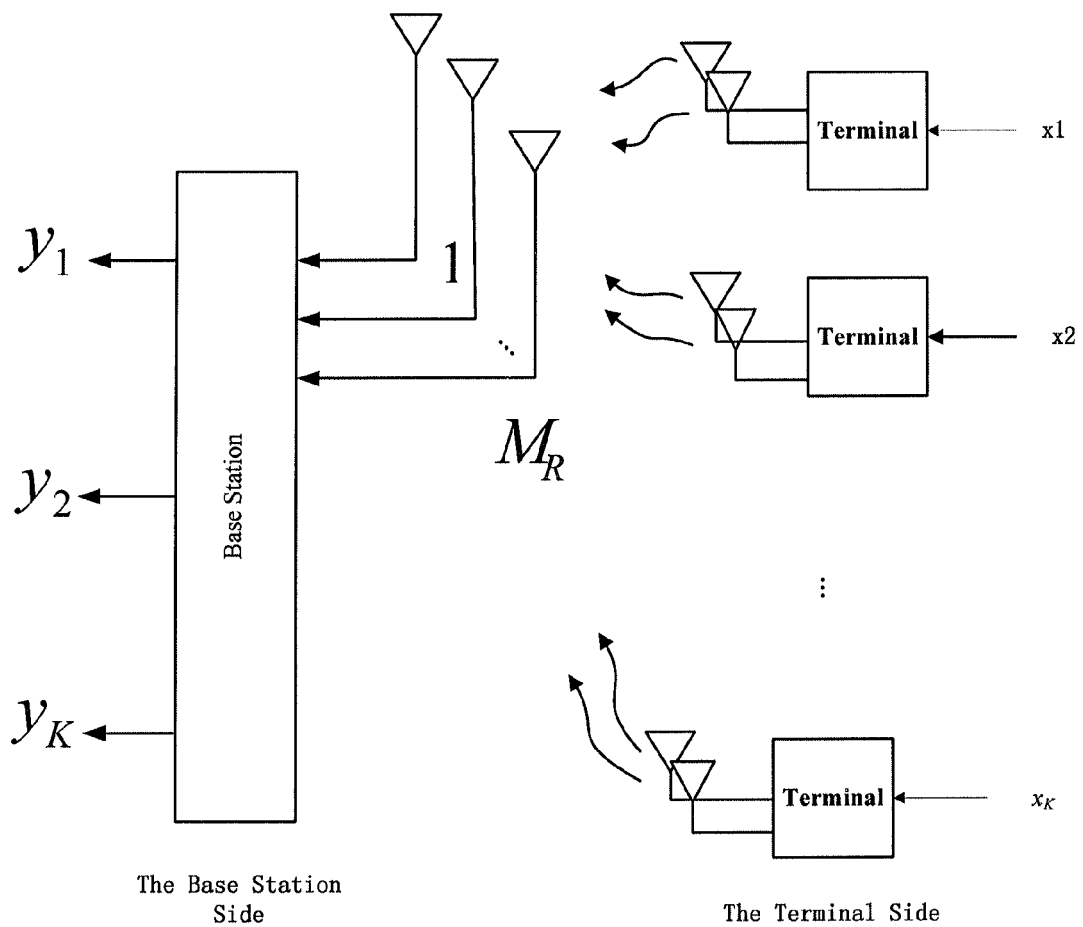
FIG. 4 presents a MU MIMO uplink system model.

Furthermore, the EMC-ProSched algorithm may be extended to be applicable to the uplink multi-user MIMO transmission. FIG. 4 presents a MU MIMO uplink system model. In the uplink MU MIMO system, a group of users transmit information to the base station at the same frequency and at the same time, a high spatial correlation between the terminal users may also cause energy loss. Therefore, the post-process at the base station side needs to cope with the interference between the user terminals which performs transmitting at the same time. So, the base station side may adopt the EMC-ProSched scheduling algorithm provided in the present patent. Of course, since the scheduling criteria in the present invention are for capacity, the scheduling criteria in the uplink transmission need some modifications. After completing the scheduling, the base station side issues the decision-making information to the user terminal, and the user terminal encode the information to be transmitted according to the decision-making information, and then performs the SDMA transmission.

As a method for rate estimation, the EMC-ProSched algorithm may be used jointly with the fairness algorithm directly, so as to achieve an equitable space assignment in terms of time and throughput and the like. In an example, when proportional criteria is adopted, the rate estimation for the $i^{th}$ user in the user group S may be obtained by normalizing its average metric in a long time:

$$\gamma_i^{(S)} = \eta_i^{(S)}/\overline{\eta}_i,$$

Herein $\overline{\eta}_i$ represents an average of the final scheduling decided metric of the user in the preceding m slots $$\overline{\eta}_i(n) = (1/m) \sum_{\mu=n}^{n-m-1} \eta_i(\mu).$$

Because of the normalization of the average rate in a relatively long time, the proportional fair scheduling can solve the near-far problem to a certain extent.

Figure 5:
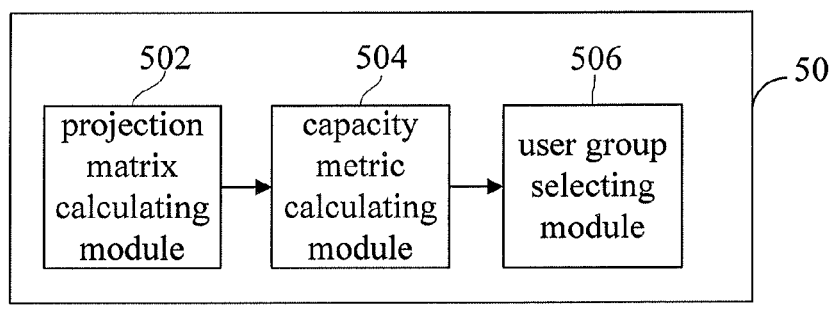
FIG. 5 illustrates a schematic structural diagram of a base station which performs user grouping according to an embodiment of the present invention.

FIG. 5 illustrates a schematic structural diagram of a base station which performs user grouping according to an embodiment of the present invention. In the base station 50, a projection matrix calculating module 502 calculates a projection matrix of a channel information matrix of a user on a joint channel matrix other users in the same user group. In an example, the projection matrix calculating module calculates a projection matrix of a $j^{th}$ sub-carrier of an $i^{th}$ user in the user group by using an orthonormal basis of signal space on the $j^{th}$ sub-carrier of the $i^{th}$ user, wherein i, j are positive integers respectively. In another example, the projection matrix calculating module performs singular value decomposition to the joint channel matrix of the other users except the $i^{th}$ user on the $j^{th}$ sub-carrier, and then calculates a projection matrix of the $j^{th}$ sub-carrier of the $i^{th}$ user in the user group, wherein i, j are positive integers respectively.

A capacity metric calculating module 504 calculates a capacity metric of the user group according to the projection matrix. In an example, the capacity metric calculating module performs fairness algorithm calculation to the capacity metric of the user group. In an embodiment, the capacity metric calculating module calculates a capacity metric of each sub-carrier of each user in the user group according to the projection matrix of the user; weights the capacity metric of each sub-carrier of each user in the user group; calculates a capacity metric of each user in the user group and the capacity metric of the user group, based on the weighted capacity metric of each sub-carrier of each user.

a user group selecting module 506 selects a user group according to the capacity metrics of a plurality of user groups.

Then the base station transmits, in accordance with the provision of SDMA, the data of each user in the selected user group through several antennas, respectively, after performing the series of process of coding, modulation, filtering, and so on.

In an example, the base station further includes a module which adds a user to or deletes a user from the user group by adopting a tree-based algorithm to obtain the plurality of user groups.

In an example, the MU MIMO system is an OFDMA system. The base station selects the users which are served at the same time and on the same sub-carrier set. For this kind of user group, the base station performs user group scheduling, that is, makes the projection matrix calculating module, the capacity metric calculating module, and the user group selecting module performs the corresponding operation to the user group in which the users are served at the same time and on the same sub-carrier-set.

In an example, the base station includes a transmitting module which provides SDMA transmission in downlink direction to the users simultaneously in the selected user group.

In an example, the base station includes a transmitting module which transmits the pre-coding matrix determined according to the selected user group to the terminal. The terminal performs data encoding to each user in the user group after receiving the pre-coding matrix, and transmits the encoded data in uplink direction.

Figure 6:
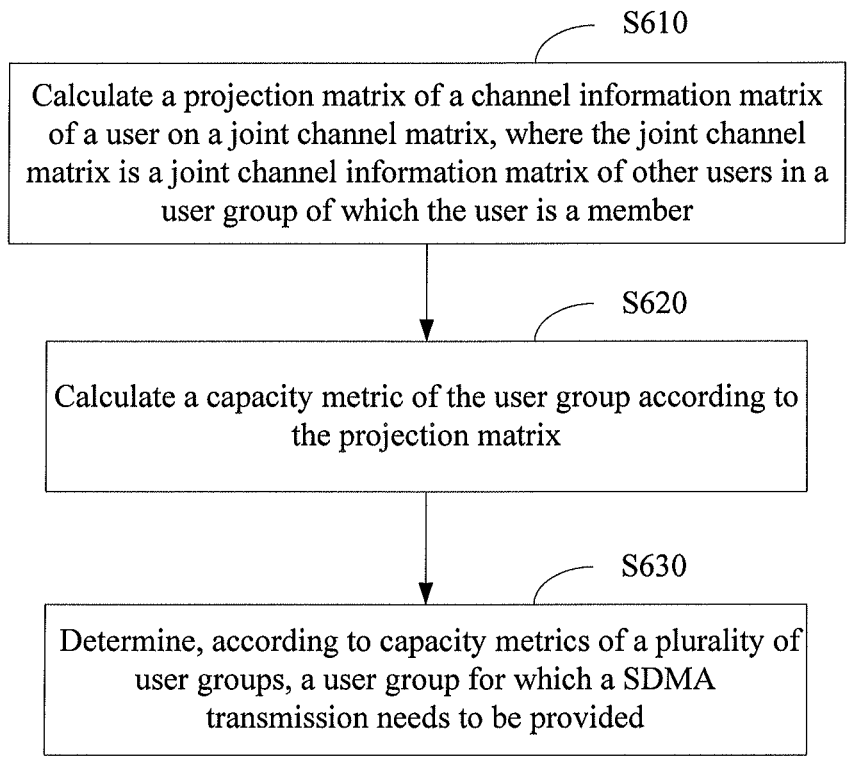
FIG. 6 is a schematic flowchart of an SDMA transmission according to an embodiment of the present invention.

Referring to FIG. 6, FIG. 6 is a schematic flowchart of an SDMA transmission according to an embodiment of the present invention.

S610. Calculate a projection matrix of a channel information matrix of a user on a joint channel matrix, where the joint channel matrix is a joint channel information matrix of other users in a user group of which the user is a member.

For example, a projection matrix of the $j^{th}$ sub-carrier of the $i^{th}$ user in the user group is calculated by using the orthonormal basis of signal space on the $j^{th}$ sub-carrier of the $i^{th}$ user, herein i, j are positive integers respectively. Or, singular value decomposition is performed to the joint channel matrix of the other users except the $i^{th}$ user on the $j^{th}$ sub-carrier, and then a projection matrix of the $j^{th}$ sub-carrier of the $i^{th}$ user in the user group is calculated, herein i, j are positive integers respectively.

S620. Calculate a capacity metric of the user group according to the projection matrix.

In the calculation, a fairness algorithm calculation is performed to the capacity metric of the user group. The specific method may include: calculating a capacity metric of each sub-carrier of each user in the user group according to the projection matrix of the user; weighting the capacity metric of each sub-carrier of each user in the user group; calculating a capacity metric of each user in the user group and a capacity metric of the user group, based on the weighted capacity metric of each sub-carrier of each user. Or, the method may include calculating the frobenius of the product of the channel matrix of the user and the projection matrix of the user, and taking the frobenius as the capacity metric of the user.

S630. Determine, according to capacity metrics of a plurality of user groups, a user group for which a SDMA transmission needs to be provided.

In the implementation, a tree-based algorithm may be used to add or delete a user so as to obtain the plurality of user groups, and the capacity metrics of the plurality of user groups is further calculated.

In this embodiment, if the MU MIMO system is an OFDMA system, then before the step of calculating the projection matrix of a channel information matrix of each user in the user group on the joint channel matrix of the other users in the same user group, the method includes: selecting users which are served at a same time and on a same sub-carrier set, and constituting the user group.

In order to verify the performance of the scheduling algorithms provided in the present patent, a simulation is made by using MATLAB. The configuration and parameter setting of the simulation are in accordance with the specifications of the scenario 2 in IEEE 802.11ac [IEEE451].

Figure 7:
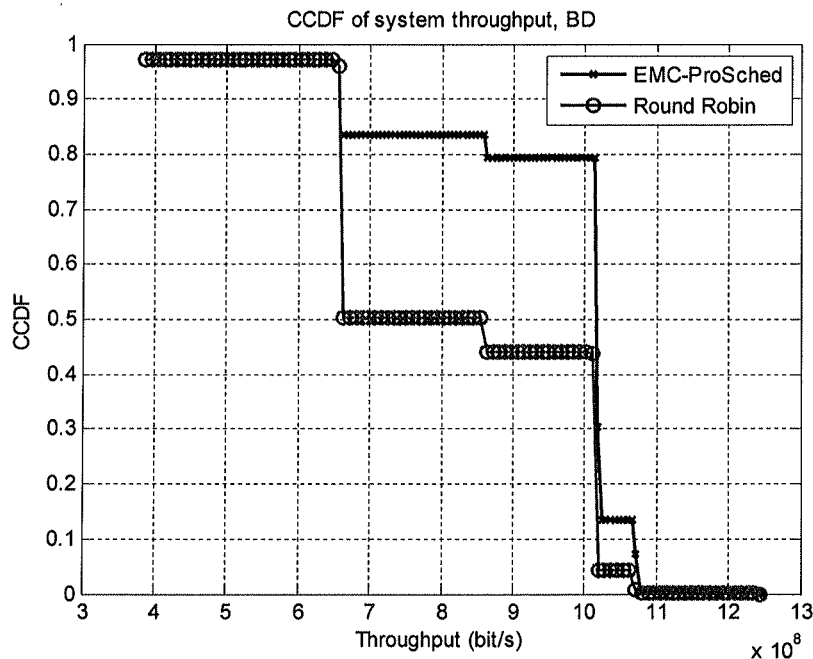
FIG. 7 is a comparison chart of throughput of an EMC-ProSched and a Round Robin, which use BD as a pre-coding algorithm.

FIG. 7 is a comparison chart of throughput (system throughput) of an EMC-ProSched algorithm and a Round Robin (Round-Robin Scheduling) algorithm, which use BD (Block Diagonalization, block diagonalization) as the pre-coding algorithm in the case that the size of PSDU (Physical Layer (PHY) Service Date Unit, physical layer service date unit) is 5000 B. In the simulation, 4 users are selected from 8 users to be served at the same time and at the same frequency. Each user has two receiving antennas. Number of data streams transmitted to each user is 2, the total number of spatial streams is 8. In the figure, CCDF (Complementary Cumulative Distribution Function) is complementary cumulative distribution function. Although in this embodiment the correlation between the channels of different users is low, it can be seen clearly from the figure that, the EMC-ProSched improves the throughput significantly because the user group constituted by users of which the channels are more correlated is excluded effectively.

Figure 8:
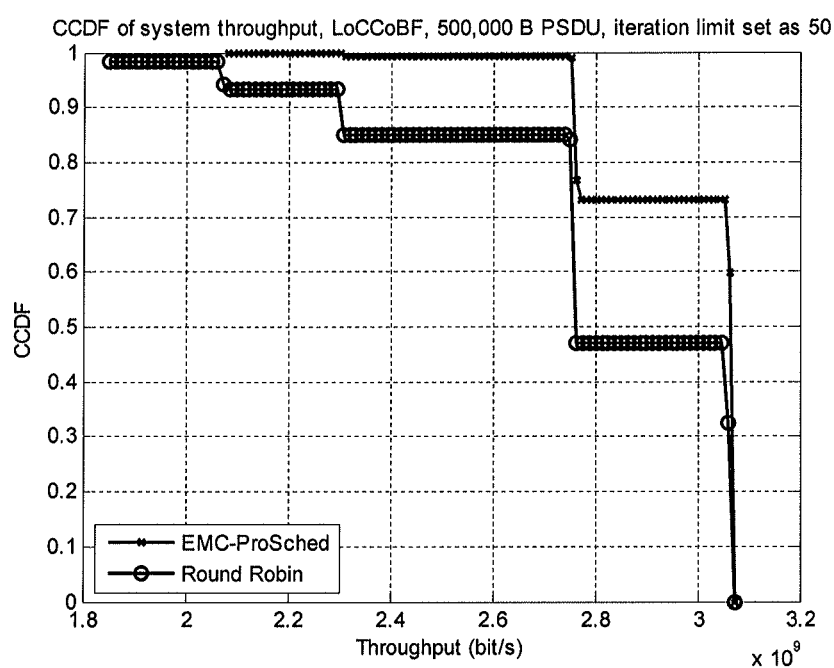
FIG. 8 is a comparison chart of throughput of an EMC-ProSched and a Round Robin algorithm, which use LoC-CoBF as a pre-coding algorithm.

FIG. 8 is a comparison chart of throughput of an EMC-ProSched algorithm and a Round Robin algorithm, which use LoCCoBF (Low Complexity Coordinated Beamforming, low complexity coordinated beamforming) as the pre-coding algorithm in the case that the size of PSDU is 5000 B. In the simulation, 4 users are selected from 8 users to be served at the same time and at the same frequency. Each user has two receiving antennas. Number of data streams transmitted to each user is 2, the total number of spatial streams is 8. The combination of EMC-ProSched and LoCCoBF also brings better performance than that of Round Robin algorithm. It should be noted that in this case, the channels are spatially uncorrelated according to [IEEE308].

It should be noted that the foregoing embodiments of the present invention have been described with a combination of the MU MIMO system, but the present invention is not limited thereto. For example, the present invention may also be applicable to a MIMO system which includes a single-input single-output (SISO) user. Furthermore, in the foregoing embodiments, the present invention calculates the capacity metric of the user group according to the projection matrix on all the sub-carriers of each user. However, it is also feasible to group sub-carriers (for example, the sub-carriers have a high correlation between each other are grouped into a same group), select a sub-carrier from the sub-carrier groups and calculate the projection matrix on the selected sub-carrier of each user.

Obviously, the invention described herein may have many variations, and such variations are not regarded as a departure from the spirit and scope of the invention. Therefore, all modifications apparent to the persons of ordinary skill in the art are included within the scope of claims of the present invention.

What is claimed is:

1. A method for a space division multiple access (SDMA) transmission in a multi-user multi-input multi-output (MU MIMO) system, comprising:

calculating, by a base station and for each of a plurality of users, a projection matrix of a channel information matrix of a respective user, wherein the projection matrix is projected onto a joint channel matrix, the joint channel matrix is a joint channel information matrix of users, other than the respective user, in a user group of which the respective user is a member, and wherein the user group being one of a plurality of user groups comprising all possible combinations of the plurality of users;

calculating, by the base station and for each of the plurality of user groups, a capacity metric according to a corresponding projection matrix;

determining, by the base station, according to capacity metrics of the plurality of user groups, a user group; and a SDMA transmission is provided by the base station to the determined user group;

wherein in the calculating the capacity metric for each of the plurality of user groups comprises: calculating a capacity metric of each sub-carrier of each user in a respective user group according to the corresponding projection matrix of the user; weighting the capacity metric of each sub-carrier of each user in the respective user group; and calculating, for each user in the respective user group, a corresponding capacity metric by generating a sum of the weighted capacity metrics of each user and, for the respective user group, the capacity metric by summing the generated sums of the weighted capacity metrics of all users in the respective user group.

2. The method according to claim 1, wherein the calculating, by the base station and for each of the plurality of users, the projection matrix of the channel information matrix of the respective user, comprises:

calculating, by the base station, a projection matrix of a $j^{th}$ sub-carrier of an $i^{th}$ user in the user group by using an orthonormal basis of signal space on the $j^{th}$ sub-carrier of the $i^{th}$ user, wherein i, j are positive integers respectively and the $i^{th}$ user is the respective user.

3. The method according to claim 1, wherein the calculating, by the base station and for each of the plurality of users, the projection matrix of the channel information matrix of the respective user, comprises:

performing, by the base station, a singular value decomposition to the projection matrix of users of a respective user group except an $i^{th}$ user of the respective user group on a $j^{th}$ sub-carrier, and calculating, by the base station, a projection matrix of the $j^{th}$ sub-carrier of the $i^{th}$ user, wherein i, j are positive integers respectively and the $i^{th}$ user is the respective user.

4. The method according to claim 1, further comprising: adding, by the base station, a user to or deleting, by the base station, a user from the user group by adopting a tree-based algorithm to obtain the plurality of user groups.

5. The method according to claim 1, wherein the step of calculating, by the base station, the capacity metric of the plurality of user groups comprises performing, by the base station, fairness algorithm calculation to the capacity metric of each of the user of the plurality of user groups.

6. The method according to claim 1, wherein the step of calculating, by the base station, the capacity metric of the plurality of user groups according to the corresponding projection matrix, comprises:

calculating, by the base station, a frobenius of a product of respective channel matrix of each of the user of each of the user group and the corresponding projection matrix, and taking, by the base station the frobenius as the capacity metric of the respective user.

7. The method according to claim 1, wherein the MU MIMO system is an OFDMA system, the method further comprises:

before the step of calculating, by the base station and for each of the plurality of users, the projection matrix of the channel information matrix of each user in the user group, wherein the projection matrix is projected onto the joint channel matrix of the other users in the same user group, selecting, by the base station, users which are served at a same time and on a same sub-carrier set, and constituting the user group.

8. The method according to claim 1, comprising: providing, by the base station, the SDMA transmission in a downlink direction to the determined users group simultaneously.

9. The method according to claim 1, further comprising:

transmitting, by the base station, a pre-coding matrix determined according to the determined user group to terminals corresponding to users in the determined user group, so that the terminals provide SDMA transmissions simultaneously.

10. A base station, comprising a processor executing program codes stored in a non-transitory processor-readable medium, which configures the base station to:

calculate, for each of a plurality of users, a projection matrix of a channel information matrix of a respective user, wherein the projection matrix is projected onto a joint channel matrix, the joint channel matrix is a joint channel information matrix of users, other than the respective user, in a user group of which the respective user is a member, and wherein the user group being one of a plurality of user groups comprising all possible combinations of the plurality of users;

calculate, for each of the plurality of user groups, a capacity metric according to a corresponding projection matrix;

determine according to capacity metrics of the plurality of user groups, a user group; and provide a SDMA transmission to the determined user group;

wherein in the calculating the capacity metric for each of the plurality of user groups comprises: calculating a capacity metric of each sub-carrier of each user in a respective user group according to the corresponding projection matrix of the user; weighting the capacity metric of each sub-carrier of each user in the respective user group; and calculate, for each user in the respective user group, a corresponding capacity metric by generating a sum of the weighted capacity metrics of each user and, for the respective user group, the capacity metric by summing the generated sums of the weighted capacity metrics of all users in the respective user group.

11. The base station according to claim 10, wherein the base station is specifically configured to:

calculate a projection matrix of a $j^{th}$ sub-carrier of an $i^{th}$ user in the user group by using an orthonormal basis of signal space on the $j^{th}$ sub-carrier of the $i^{th}$ user, wherein i, j are positive integers respectively and the $i^{th}$ user is respective user.

12. The base station according to claim 10, wherein the base station is specifically configured to:

perform singular value decomposition to the joint channel matrix of other users of a respective user group except an $i^{th}$ user of the respective user group on a $j^{th}$ sub-carrier, and calculate a projection matrix of the $j^{th}$ sub-carrier of the $i^{th}$ user in the user group, wherein i, j are positive integers respectively and the $i^{th}$ user is the respective user.

13. The base station according to claim 10, wherein base station is further configured to add a user to or delete a user from a user group by adopting a tree-based algorithm to obtain the plurality of user groups.

* * * * *